Sept. 19, 1939.　　　　F. J. BRACONI　　　　2,173,750
SNAP HOOK
Filed July 7, 1938
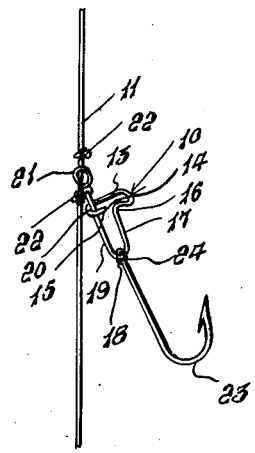
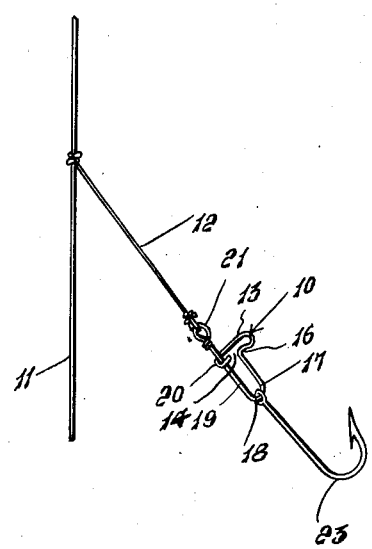
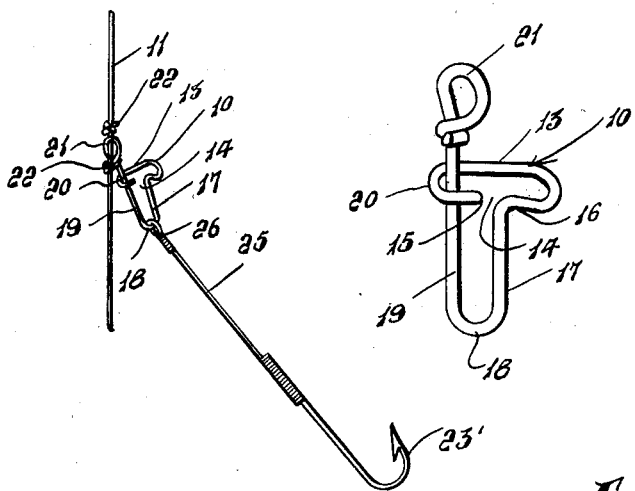
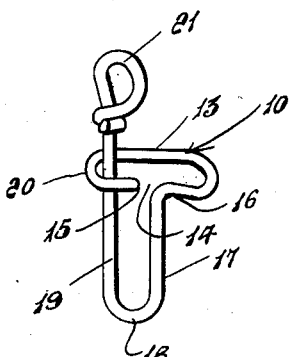
Inventor
Frank J. Braconi Patented Sept. 19, 1939

2,173,750

UNITED STATES PATENT OFFICE 2,173,750

SNAP HOOK

Frank J. Braconi, San Francisco, Calif.

Application July 7, 1938, Serial No. 217,982

3 Claims. (Cl. 24—237)

This invention relates to an improved attaching device for connecting fish hooks and fishing lines.

It is an object of this invention to provide an improved fastening member adapted to be secured to a fishing line and constructed to readily engage or release a fish hook.

More particularly, it is an object of this invention to provide a device for connecting fish hooks to a fishing line formed from a single strand of wire and constructed to be readily opened for detaching a fish hook therefrom or attaching a fish hook thereto, and in which the fish hook is so disposed, that regardless of the pull thereon there will be no tendency to disengage the device so that the fish hook could be reased therefrom.

Still a further object of the invention, is to provide a device, as heretofore described, that must be compressed and moved in two directions for opening or moving it to a releasing position.

Other objects and advantages of the invention will hereinafter become more fully apparent from the following description of the drawing, which illustrates a preferred form of the invention, and wherein:

Figure 1 is an elevational view showing the device attached to a fishing line and having a hook attached thereto, Figure 2 is a view similar to Figure 1 showing a short length of line leading from a fishing line and to which the device is attached, Figure 3 is a view similar to Figure 1 showing a hook provided with a leader which is attached to the device, and Figure 4 is an enlarged perspective view of the invention.

Referring more particularly to the drawing, wherein like reference characters indicate like or corresponding parts throughout the different views, 10 designates generally the invention, as best seen in Figure 4 which is adapted to be attached to a fishing line 11, either directly or by means of the short length of line 12.

The fastener designated generally 10, and as best seen in Figure 4, is preferably formed from a single strand of resilient wire which is bent at one end to provide an elongated loop 13 which is provided with the opening 14 in one of its sides intermediate of its ends, formed by spacing the end 15 from the bend portion 16. The strand from the end 16 of the loop extends downwardly to form the leg 17 and is bent upwardly at 18 to form the leg 19, which is spaced from the leg 17 and which extends through the loop 13 adjacent its end 20. The upper end of the leg 19, which extends above the loop 13 is bent and twisted to form the eyelet 21.

Eyelet 21 is threaded onto the line 11, as seen in Figures 1 and 3, after which the line 11 is knotted, as indicated at 22, above and beneath the eyelet 21 to permit the fastener 10 while held in engagement with the line 11 to be rotated thereon to prevent the fastener from unraveling the line. In Figure 2, a secondary line 12 is attached at one end to the fishing line 11 and at its opposite end to the eyelet 21. In Figures 1 and 2 the hook 23 is provided with an eyelet 24 at the free end of its shank, which is connected directly with the fastener 10, and in Figure 3 the hook 23' is provided with a leader 25 having an eyelet 26 at its free end, which is connected to the fastener 10. These three forms of connections as illustrated in Figures 1, 2 and 3, are shown merely to illustrate that the fastener 10 may be associated in various ways with the fishing line 11 and with the hooks 23 and 23', without modifying the invention, and it is to be understood that the fastener 10 is adapted for use in various other ways in connection with fishing tackle, than as illustrated.

To attach the hooks 23 or 23' to the fastener 10, leg 19, which is held by the normal tension of the strand adjacent the end 20 of the loop 13, is pressed inwardly of the loop 13 at its upper, eyelet end 21, to move the leg 19 toward the leg 17 until it is positioned in line with the opening 14, after which it is moved transversely of the loop 13 through opening 14 and to its disengaged position. The eyelet 24 of the hook 23, or the eyelet 26 of the leader 25 is then passed over the end 15 around loop 13 and down the leg 17 to the bend 18, as seen in Figures 1, 2 and 3 after which leg 19 is again compressed and passed through opening 14, and released to move to a point in engagement with or adjacent the end 20 of the loop 13 at which time the fish hooks 23 and 23' will have been completely and securely attached to the fastener 10. When it is desired to remove the fish hook 23 or 23', leg 19 will again be compressed and removed to its released position after which the eyelet 24 or 26 will be passed up leg 17 around loop 13 and off of its end 15, so that another hook may be attached, as heretofore described.

It will be noted, that when the eyelet 24 or 26 is in engagement with the bend 18, that regardless of how much pressure or pull is applied to the hook 23 or 23' there will be no tendency to compress and release arm 19, and should the eyelet 24 or 26 move upwardly of the leg 17 or 19 an outward pressure on either leg would only tend to cause the fastener 10 to swing until the eyelet 24 or 26 had moved back into engagement with the portion 18. One of the particular advantages of the fastener 10, resides in the fact that the leg 19 must be moved in two directions to release it from the loop 13 thereby making it doubly difficult and practically impossible for the fastening 10 to be accidentally moved to its released position.

Various modifications and changes in the construction and arrangement of the fastener 10 are possible and have been contemplated, without affecting the underlying principle of construction thereof, and the right is reserved to make such variations and changes as do not depart from the spirit and scope of the invention as hereinafter defined by the appended claims.

I claim as my invention:

1. In a device of the class described, a strand of resilient wire having one end bent to provide an open elongated loop, the opposite end of said strand extending downwardly from said loop and being bent upon itself to provide an upwardly extending resilient leg, normally spaced from said downwardly extending portion and extending through said loop and being normally held in engagement with one end thereof and in spaced relationship to its opening, said leg being movable longitudinally and transversely of said loop for disengaging it therefrom, and the upper end of said leg being bent and twisted to provide an eyelet.

2. In a resilient fastener for fish hooks, a strand of resilient wire bent intermediate of its ends upon itself to form spaced legs, one of said legs being bent at its free end to form an elongated loop open at one side and intermediate of its ends, and normally enclosing said other leg, said last mentioned leg being normally held under tension at one end of said loop and having its upper free end bent and twisted to form an eyelet adapted to be connected to a fishing line, said last mentioned leg being movable longitudinally and transversely of said loop for disengaging it therefrom for positioning a fish hook in or removing it from the bend between said legs.

3. In a device of the class described, a strand of wire bent to form an elongated loop having an opening intermediate of its ends at one side thereof, the opposite end of said strand being bent to form a U-shaped member one end of which connects with said loop, the opposite end being elongated to extend through said loop and being resiliently held under tension adjacent one end thereof, said opposite end being compressible longitudinally of said loop and transversely thereof for disengaging it therefrom by means of said opening.

FRANK J. BRACONI.